United States Patent
Chen et al.

(10) Patent No.: US 12,184,653 B2
(45) Date of Patent: Dec. 31, 2024

(54) STAND-IN AUTHORIZATION SYSTEM AND STAND-IN AUTHORIZATION METHOD

(71) Applicant: CHINA UNIONPAY CO., LTD., Shanghai (CN)

(72) Inventors: Lin Chen, Shanghai (CN); Jianming Kang, Shanghai (CN); Zhijun Lu, Shanghai (CN); Yanming Yang, Shanghai (CN); Jinzhi Hua, Shanghai (CN); Xu Wang, Shanghai (CN); Sen Yang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 992 days.

(21) Appl. No.: 16/450,896

(22) Filed: Jun. 24, 2019

(65) Prior Publication Data

US 2019/0349374 A1 Nov. 14, 2019

Related U.S. Application Data

(63) Continuation of application No. 14/366,670, filed as application No. PCT/CN2012/087026 on Dec. 20, 2012, now abandoned.

(30) Foreign Application Priority Data

Dec. 22, 2011 (CN) .......................... 201110435131.9

(51) Int. Cl.
*G06Q 20/02* (2012.01)
*G06Q 20/40* (2012.01)
(Continued)

(52) U.S. Cl.
CPC ........... *H04L 63/10* (2013.01); *G06Q 20/027* (2013.01); *G06Q 20/40* (2013.01); *G06Q 40/12* (2013.12); *H04L 63/123* (2013.01)

(58) Field of Classification Search
CPC ...... G06Q 20/027; G06Q 20/40; G06Q 40/12; H04L 6363/10; H04L 63/123; H04L 63/10
See application file for complete search history.

(56) References Cited

U.S. PATENT DOCUMENTS

| | | | | |
|---|---|---|---|---|
| 5,384,449 A | * | 1/1995 | Peirce | G07F 7/08 235/380 |
| 6,119,093 A | * | 9/2000 | Walker | G06Q 30/06 705/37 |

(Continued)

FOREIGN PATENT DOCUMENTS

| | | |
|---|---|---|
| CN | 1527530 A | 9/2004 |
| CN | 101292233 A | 10/2008 |

(Continued)

OTHER PUBLICATIONS

European Search Report, dated May 7, 2015, Application No. PCT/CN2012/087026.

(Continued)

*Primary Examiner* — John W Hayes
*Assistant Examiner* — Christina Owen Sherr
(74) *Attorney, Agent, or Firm* — ANOVA LAW GROUP, PLLC

(57) ABSTRACT

The invention provides an entrusted-authorization system and an entrusted-authorization method. The entrusted-authorization system comprises an accounting system, a switch module and an entrusted-authorization module, wherein the entrusted-authorization module stores entrusted-authorization parameters determined by the accounting system, the switch module is connected with the accounting system and the entrusted-authorization module for transmitting transaction request messages from the client terminal to the entrusted-authorization module for processing in case that the accounting system is unavailable, wherein the entrusted- (Continued)

authorization module verifies the transaction request messages according to the entrusted-authorization parameters; otherwise, the messages are sent to the accounting system for processing. The transaction request messages comprise financial account information, financial institution information, transaction-initiation institution information and transaction amount. With the entrusted-authorization system and entrusted-authorization method of the invention, a normal processing of transaction request can be ensured when the accounting system is unavailable.

8 Claims, 2 Drawing Sheets

(51) Int. Cl.
  *G06Q 40/12* (2023.01)
  *H04L 9/40* (2022.01)

(56) References Cited

U.S. PATENT DOCUMENTS

| | | | | |
|---|---|---|---|---|
| 6,427,912 | B1* | 8/2002 | Levasseur | G07F 17/0014 235/380 |
| 6,999,943 | B1* | 2/2006 | Johnson | G06Q 40/025 705/37 |
| 7,379,920 | B2* | 5/2008 | Leung | G06Q 30/0225 705/50 |
| 2002/0120559 | A1* | 8/2002 | O'Mara | G06Q 40/08 705/38 |
| 2002/0139837 | A1* | 10/2002 | Spitz | G06Q 40/08 235/375 |
| 2003/0105688 | A1* | 6/2003 | Brown | G06Q 40/025 705/31 |
| 2003/0195843 | A1* | 10/2003 | Matsuda | G06Q 30/0601 705/26.1 |
| 2003/0209599 | A1* | 11/2003 | Gatto | G06Q 20/40 235/379 |
| 2005/0149455 | A1* | 7/2005 | Bruesewitz | G06Q 20/04 705/64 |
| 2006/0116957 | A1* | 6/2006 | May | G06Q 30/0609 705/40 |
| 2008/0103972 | A1* | 5/2008 | Lanc | G06Q 20/405 705/44 |
| 2009/0254443 | A1* | 10/2009 | Ahlers | G06Q 40/04 705/17 |
| 2010/0025460 | A1* | 2/2010 | Sutton | G06Q 20/325 235/379 |
| 2010/0262542 | A1* | 10/2010 | Kranzley | G06Q 20/3226 705/44 |
| 2010/0327054 | A1* | 12/2010 | Hammad | G06Q 20/40 235/375 |
| 2011/0131104 | A1* | 6/2011 | Rose | G06Q 20/20 235/487 |
| 2012/0078737 | A1* | 3/2012 | Kulakowski | G06Q 20/24 705/16 |
| 2013/0138563 | A1* | 5/2013 | Gilder | G06Q 20/4016 705/44 |

FOREIGN PATENT DOCUMENTS

| | | | | |
|---|---|---|---|---|
| CN | 101329795 | A | 12/2008 | |
| CN | 101950452 | A | 1/2011 | |
| CN | 102096968 | A | 6/2011 | |
| CN | 102195943 | A | 9/2011 | |
| CN | 102291370 | A | 12/2011 | |
| CN | 103177388 | A * | 6/2013 | G06Q 20/027 |
| WO | 2007002236 | A2 | 1/2007 | |

OTHER PUBLICATIONS

Chinese Office Action with English Language Translation, dated Jul. 24, 2015, Chinese Application No. 2011104351319.

* cited by examiner

STAND-IN AUTHORIZATION SYSTEM AND STAND-IN AUTHORIZATION METHOD

CROSS-REFERENCES TO RELATED APPLICATIONS

This application is a continuation application of U.S. patent application Ser. No. 14/366,670, filed on Jun. 18, 2014, which is a national stage entry of PCT Patent Application No. PCT/CN2012/087026, filed on Dec. 20, 2012, which claims priority to Chinese Patent Application No. 201110435131.9, filed on Dec. 22, 2011, all of which are incorporated by reference in entirety.

FIELD OF THE INVENTION

The present invention relates to the field of data processing, and in particular, to an entrusted-authorization system and an entrusted-authorization method.

BACKGROUND

Entrusted-authorization business of on-line accounting system has just started domestically. A sharing platform for previous applications such as bank card on-line entrusted-authorization does not exist. Thus, various on-line accounting systems can only cope with some risks by using multi-machine backup. However, if the on-line accounting system needs a whole computer system maintenance or it cannot provide a linking service to the outside world due to some disastrous reasons, such computer system can completely go down. Big foreign credit-card organizations have mandatory requirements of entrusted-authorization for their admitted member institutions. However, comparatively speaking, such business modes and computer platforms offer less personalized customizations to the admitted member institutions, and have more constraints.

SUMMARY OF THE INVENTION

In this regard, the present invention provides an entrusted-authorization system and an entrusted-authorization method for ensuring normal processing of transaction requests in case that the online accounting system is unavailable.

The present invention provides the following technical solutions:

1. An entrusted-authorization system, characterized in that, the entrusted-authorization system comprises an accounting system, a switch module, and an entrusted-authorization module, wherein the entrusted-authorization module stores entrusted-authorization parameters determined by the accounting system; the switch module is connected with the accounting system and the entrusted-authorization module for transmitting transaction request messages from the client terminal to the entrusted-authorization module in case that the accounting system is unavailable, whereby the entrusted-authorization module verifies the transaction request messages according to the entrusted-authorization parameters; otherwise (i.e., the accounting system is available), the messages are sent to the accounting system for processing, the transaction request messages comprise financial account information, financial institution information, transaction-initiation institution information and transaction amount.

2. The entrusted-authorization system according to technical solution 1, characterized in that, the entrusted-authorization module comprises a data communication module, a verification processing module, and a database, wherein the data communication module is connected between the switch module and the verification processing module so as to transfer information therebetween; the database stores the entrusted-authorization parameters, the transaction information, and cause of failure. The entrusted-authorization parameters comprise financial institution information, transaction-initiation institution information, account amount and account information, the account information comprises information selected from a group comprising the following items: card number, term of validity of the card, check digit of the card, password encryption data, verification number of the card (CVN), information in IC card which corresponds to the ones in validity verification items of account.

The verification processing module stores the validity verification items of account, where the validity verification items of account comprise at least one of verification of card number, verification of term of validity of the card, verification of check digit of card, verification of password, verification of CVN, and verification of IC card information; the verification processing module is configured to perform the following steps:

A. verifying validity of the transaction request messages, and performing subsequent steps if the verification is approved, or otherwise generating and sending a response message indicating failure to the data communication module and sending the cause of failure to the database;

B. verifying the transaction request messages according to the financial institution information and the transaction-initiation institution information in the entrusted-authorization parameters, and performing subsequent steps if the verification is approved, or otherwise generating and sending a response message indicating the failure to the data communication module and sending the cause of the failure to the database;

C. determining the account-validity verification items according to the account information and performing verification according to the determined account-validity verification items, and performing subsequent steps if the verification is approved, or otherwise generating and sending a response message indicating the failure to the data communication module and sending the cause of the failure to the database; and D. verifying the transaction request according to account amount, and in case of approved verification, completing the transaction in the transaction request, generating and sending a response message indicating the success to the data communication module, and generating and sending transaction information to the database, or otherwise generating and sending a response message indicating the failure to the data communication module and sending the cause of failure to the database, the transaction information comprises financial account information, financial institution information, transaction-initiation institution information, transaction amount, transaction type and transaction date.

3. The entrusted-authorization system according to technical solution 2, characterized in that the verification processing module stores account-risk verification items, the account-risk verification items comprises at least one of verification of account blacklist, verification of merchant blacklist and verification of upper limit control, the entrusted-authorization parameters further comprises account risk information which further comprises information selected from a group comprising the following items:

information in the account blacklist, merchant blacklist and upper limit control that corresponds to the items in the account-risk verification items; wherein the verification processing module determines the account-risk verification items according to the account risk information and performing verification according to the determined account-risk verification items, and step D is performed if the verification is approved, or otherwise, the verification processing module generates and sends a response message indicating the failure to the data communication module and sending the cause of failure to the database.

4. The entrusted-authorization system according to technical solution 2 or 3, characterized in that the entrusted-authorization parameters further comprises permitted transaction types and the verification processing module is further configured to: determine the transaction types according to the transaction request messages; and verify the transaction types according to the permitted transaction type.

5. The entrusted-authorization system according to one of technical solutions 2 to 4, characterized in that the entrusted-authorization module further comprises: a parameter uploading module for uploading the entrusted-authorization parameters determined by the accounting system to the database when the accounting system is available; and a transaction delivering module for delivering the transaction information and the cause of failure during the entrusted-authorization in the database to the accounting system when the switch module switches the transaction to the accounting system.

6. An entrusted-authorization method applied to entrusted-authorization system, characterized in that the entrusted-authorization system comprises an accounting system, an entrusted-authorization module and a switch module connected with the accounting system and the entrusted-authorization module, the entrusted-authorization module stores entrusted-authorization parameters determined by the accounting system, the entrusted-authorization method comprising: the switch module transmits transaction request messages from the client terminal to the entrusted-authorization module in case that the accounting system is unavailable, whereby the entrusted-authorization module verifies the transaction request messages according to the entrusted-authorization parameters; otherwise, sending the messages to the accounting system for processing, wherein the transaction request messages comprise financial account information, financial institution information, transaction-initiation institution information and transaction amount.

7. The entrusted-authorization method according to technical solution 6, characterized in that the entrusted-authorization parameters comprise financial institution information, transaction-initiation institution information, account amount and account information, the account information comprises information selected from a group comprising the following items: card number, term of validity of the card, check digit of the card, password encryption data, verification number of the card (CVN), information in IC card which corresponds to items in the account-validity verification items, wherein the entrusted-authorization module verifying the transaction request messages according to the entrusted-authorization parameters comprises the following steps:

A. the entrusted-authorization module verifies the validity of the transaction request messages, and performs subsequent steps if the verification is approved, or otherwise generates and sends a response message indicating the failure to the switch module and saves the cause of failure in the entrusted-authorization module;

B. verifies the transaction request messages according to the financial institution information and the transaction-initiation institution information in the entrusted-authorization parameters, and performs subsequent steps if the verification is approved, or otherwise generates and sends a response message indicating the failure to the switch module and saves the cause of failure in the entrusted-authorization module;

C. determines the account-validity verification items according to account information and performs the verification according to the determined account-validity verification items, and performs subsequent steps if the verification is approved, or otherwise generates and sends a response message indicating the failure to the switch module and saves the cause of failure in the entrusted-authorization module; wherein the account-validity verification items is stored in the entrusted-authorization module, and the account-validity verification items comprise at least one of verification of card number, verification of term of validity of the card, verification of check digit of the card, verification of password, verification of CVN, and verification of IC card information;

D. verifies the transaction request according to the account amount, and in case of verification being approved, completing the transaction in the transaction request, generates and sends a response message indicating the success to the switch module, and generates and saves the transaction information to the entrusted-authorization module, or otherwise generates and sends a response message indicating the failure to the switch module and saves the cause of failure in the entrusted-authorization module, the transaction information comprises financial account information, financial institution information, transaction-initiation institution information, transaction amount, transaction types and transaction dates.

8. The entrusted-authorization method according to technical solution 7, characterized in that the entrusted-authorization module verifying the transaction request messages according to the entrusted-authorization parameters comprises the following steps:

E. the entrusted-authorization module determines account-risk verification items according to account risk information and performs the verification according to the determined account-risk verification items, and performs step D if the verification is approved, or otherwise, generates and sends a response message indicating the failure to the switch module and saves the cause of failure in the entrusted-authorization module, wherein the account-risk verification items is stored in the entrusted-authorization module, the account-risk verification items comprises at least one of verification of account blacklist, verification of merchant blacklist and verification of upper limit control, the entrusted-authorization parameters further comprises information selected from a group comprising the following items: information in the account blacklist, merchant blacklist, and upper limit control that corresponds to items in account-risk verification items.

9. The entrusted-authorization method according to technical solution 7 or 8, characterized in that the entrusted-authorization parameters further comprises permitted transaction types, and verifying the transaction request messages according to the entrusted-authorization parameters comprises: the entrusted-authorization module determining the transaction types according to the transaction request messages; and the entrusted-authorization module verifying the transaction types according to the permitted transaction types.

10. The entrusted-authorization method according to one of technical solutions 6 to 9, characterized in that the method further comprises: uploading the entrusted-authorization parameters determined by the accounting system to the database when the accounting system is available; and the entrusted-authorization module delivering the transaction information and the cause of failure during entrusted-authorization to the accounting system when the switch module switches the transaction to the accounting system.

With the entrusted-authorization system and the entrusted-authorization method of the invention, a normal processing of transaction request can be ensured when the accounting system is unavailable.

In addition, the entrusted-authorization system and the entrusted-authorization method of the invention can be flexibly applied, can effectively solve the problems such as the on-line accounting system not being able to provide service to the outside in case of disastrous computer system shutdown, overall upgrading, etc. Moreover, admitted member institutions (i.e. the accounting systems) are given a maximum freedom of control, which is flexible, safe, controllable, and can greatly reduce the costs involved in a case where each on-line accounting system builds up a backup system so that the admitted member institutions can set entrusted-authorization parameters as actually required.

DETAILED DESCRIPTION OF THE INVENTION

Preferred embodiments of the invention will be described below in detail with reference to the accompanying drawings in which like figure references denote like elements.

Figure 1:
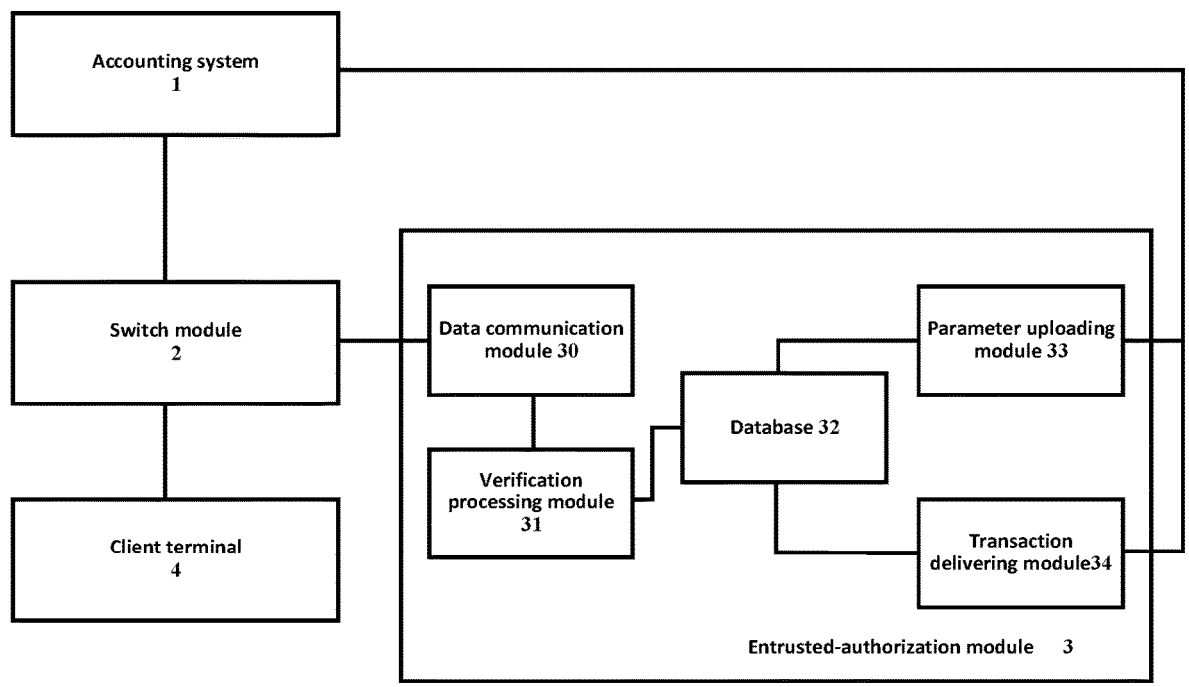
FIG. 1 is a schematic view showing the structure of the entrusted-authorization system of the invention.

FIG. 1 is a schematic view showing the structure of the entrusted-authorization system of the invention. As shown in FIG. 1, the entrusted-authorization system of the invention comprises an accounting system 1, a switch module 2 and an entrusted-authorization module 3. The accounting system 1 may be an online accounting system from a member institution, such as a bank or other financial institution, and the entrusted-authorization module 3 is an entrusted-authorization entity of the accounting system 1, i.e., authorized to stand-in for the accounting system 1.

The entrusted-authorization module 3 comprises a data communication module 30, a verification processing module 31 and a database 32. Preferably, the entrusted-authorization module 3 of the invention further comprises a parameter uploading module 33 and a transaction delivering module 34.

The entrusted-authorization module 3 stores the entrusted-authorization parameters determined by the accounting system 1. The switch module 2 is connected with the accounting system 1 for transmitting transaction request messages from the client terminal 4 to the entrusted-authorization module 3 in case that the accounting system 1 is unavailable, the entrusted-authorization module 3 verifies the transaction request messages according to the entrusted-authorization parameters; otherwise (i.e., when the accounting system 1 is available), the messages are sent to the accounting system 1 for processing, wherein the transaction request messages comprise financial account information, financial institution information, transaction-initiation institution information, and transaction amount.

The parameter uploading module 33 is used for uploading the entrusted-authorization parameters from the accounting system 1 to the database 32 when the accounting system is available. The transaction delivering module 34 is used for delivering transaction information and cause of failure during entrusted-authorization stored in the database 32 to the accounting system 1 when the switch module 2 switches transaction to the accounting system 1.

The data communication module 30 is connected between the switch module 2 and the verification processing module 31 so as to transfer information therebetween. The database 32 stores the entrusted-authorization parameters, the transaction information and the cause of failure. The entrusted-authorization parameters comprise financial institution information, transaction-initiation institution information, account amount, and account information, in which the account information comprises information selected from a group comprising the following items: card number, term of validity of the card, check digit of the card, password encryption data, verification number of the card (CVN), information in the IC card which corresponds to items in the account-validity verification items.

The verification processing module 31 is configured to perform the following steps:

A. verifying the validity of the transaction request messages, and performing subsequent steps if the verification is approved, or otherwise (i.e., if the verification is not approved) generating and sending a response message indicating failure to the data communication module 30 and sending the cause of failure to the database 32. Since the verification of the validity of messages pertains to common knowledge in the art, it is not discussed in detail herein.

B. verifying the transaction request messages according to the financial institution information and the transaction-initiation institution information in the entrusted-authorization parameters, and performing subsequent steps if the verification is approved, or otherwise generating and sending a response message indicating failure to the data communication module 30 and sending the cause of failure to the database 32.

C. determining the account-validity verification items according to the account information and performing verification according to the determined account-validity verification items, and performing subsequent steps if the verification is approved, or otherwise generating and sending a response message indicating failure to the data communication module 30 and sending the cause of failure to the database 32; wherein the account-validity verification items are stored in the verification processing module, and the account-validity verification items comprise at least one of the verification of card number, verification of term of validity of the card, verification of check digit of the card, verification of password, verification of CVN, and verification of IC card information.

D. verifying the transaction request according to account amount, and in case of the verification being approved, generating and sending a response message indicating success to the data communication module 30, and generating and sending transaction information to the database 32, or otherwise generating and sending a response message indicating the failure to the data communication module 30 and sending the cause of failure to the database 32, the transaction information comprises financial account information, financial institution information, transaction-initiation institution information, transaction amount, transaction types, and transaction dates.

In step B, if the entrusted-authorization parameters are consistent with financial institution information and transaction-initiation institution information in the transaction request messages, then the verification is approved; otherwise, the verification is not approved.

In step C, an example can be used where the account-validity verification items comprises verification of card number and verification of term of validity of the card. If account information in the entrusted-authorization parameters comprises card number or term of validity of the card or both (taking the account information comprising both card number and term of validity of the card as an example), it is determined to verify the card number and the term of validity of the card. If the card numbers are consistent and the current date is within the term of validity of the card, the verification is approved; otherwise, the verification is not approved. Those skilled in the art can determine the entrusted-authorization parameters as actually required so as to determine the corresponding account-validity verification items, thus providing the accounting system 1 with greater flexibility and selectivity. That is, individual accounting system can define its own entrusted-authorization parameters.

Further, the entrusted-authorization parameters further comprise account risk information, which further comprises information selected from a group comprising the following items: account blacklist, merchant blacklist, and upper limit control that corresponds to the items in the account-risk verification items. The account-risk verification items are stored in the verification processing module 31 and comprises at least one of verification of account blacklist, verification of merchant blacklist, and verification of upper limit control. The verification processing module 31 can also determine the account-risk verification items according to the account risk information and perform verification according to the determined account-risk verification items. If the verification is approved, the step D is performed; otherwise, a response message indicating failure is generated and sent to the data communication module 30 and the cause of failure is sent to the database 32.

For example, the account-risk verification items comprises the verification of account blacklist and the verification of upper limit control. Account risk information then comprises account blacklist or upper limit or both. Taking the account risk information comprising only account blacklist as an example, it is determined to verify account blacklist. If the financial account information in the transaction request messages is in the account blacklist, then the verification is not approved; otherwise, the verification is approved.

Further, the entrusted-authorization parameters further comprises permitted transaction types, the verification processing module 31 is configured to determine the transaction types according to the transaction request messages and verify the transaction types according to the permitted transaction types. If a determined transaction type belongs to a permitted transaction type, then the verification is approved; otherwise, the verification is not approved. The permitted transaction type supports various transactions in the art. The specific transaction type is selected by the entrusted-authorization member institutions (i.e., the accounting systems), and different entrusted-authorization member institutions (i.e., the accounting systems) can select completely different transaction types. The permitted transaction type includes consumption transaction, authorized transaction, payment transaction, cash-withdraw transaction and pre-authorization transaction, without being limited thereto. With development of the technology, other new types of transactions can be further included without departing from the scope of protection of the invention.

Figure 2:
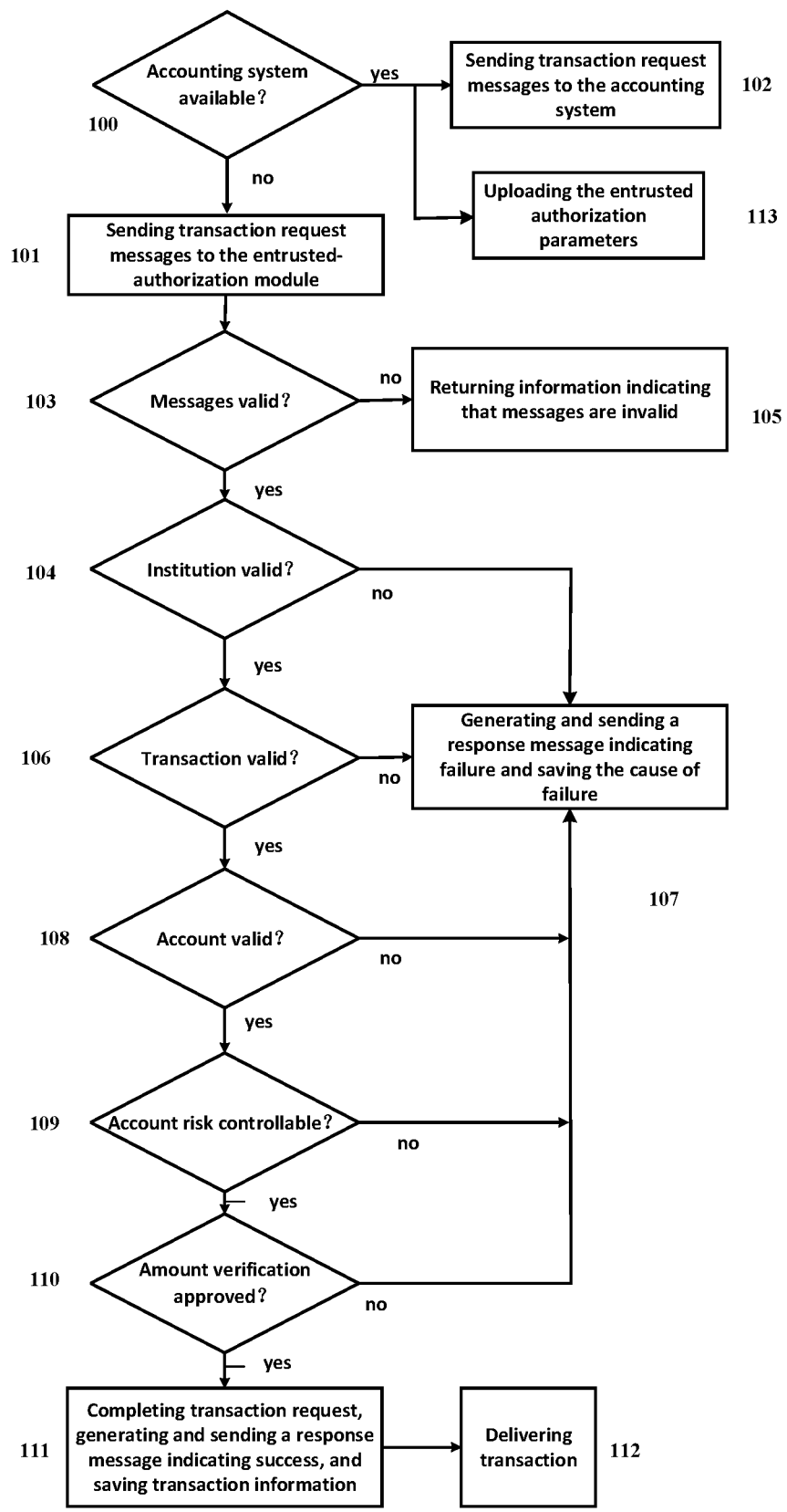
FIG. 2 is a schematic view showing the flowchart of the entrusted-authorization method of the invention.

FIG. 2 is a schematic view showing the flowchart of the entrusted-authorization method of the invention which is applied to entrusted-authorization system. The entrusted-authorization system comprises an accounting system, an entrusted-authorization module, and a switch module connected to the accounting system and the entrusted-authorization module. The entrusted-authorization module stores the entrusted-authorization parameters determined by the accounting system. As shown in FIG. 2, the entrusted-authorization method of the invention comprises the following steps:

Step 100, in which it is determined whether the accounting system is available; if not available, Step 101 is performed; otherwise, Step 102 is performed.

Step 101, in which the switch module sends transaction request messages from the client terminal to the entrusted-authorization module so as to be processed by the entrusted-authorization module according to the entrusted-authorization parameters; the transaction request messages comprise financial account information, financial institution information, transaction-initiation institution information, and transaction amount.

Step 102, in which the switch module sends transaction request messages from the client terminal to the accounting system so as to be processed by the accounting system.

Step 103, in which the entrusted-authorization module verifies the validity of the messages; if valid, Step 104 is performed; otherwise, Step 105 is performed.

Step 104, in which the entrusted-authorization module verifies the validity of the financial institution; if the verification is approved, Step 106 is performed; otherwise, Step 107 is performed. The entrusted-authorization module verifies the transaction request messages according to financial institution information and transaction-initiation institution information in the entrusted-authorization parameters. If the financial institution information and transaction-initiation institution information in the entrusted-authorization parameters are consistent with those in the transaction request messages, the verification is approved; otherwise, the verification is not approved.

Step 105, in which the entrusted-authorization module returns the information indicating that messages are illegal to the switch module.

Step 106, in which the entrusted-authorization module verifies the validity of the transaction in the transaction request. If the verification is approved, Step 108 is performed; otherwise, Step 107 is performed; wherein the entrusted-authorization parameters further comprises permitted transaction types, a transaction type is determined according to the transaction request messages and the transaction type is verified according to the permitted transaction type. If the determined transaction type belongs to the permitted transaction type, the verification is approved; otherwise, the verification is not approved. The permitted transaction type supports various transactions in the art, the specific transaction type is selected by the entrusted-authorization member institutions (i.e., the accounting systems), and different entrusted-authorization member institutions (i.e., the accounting systems) can select completely different transaction types; the permitted transaction types include consumption transaction, authorized transaction, payment transaction, cash-withdraw transaction, and pre-authorization transaction, but without being limited thereto. With the development of the technology, other new types of transactions can be further included without departing from the scope of protection of the invention.

Step 107, in which the entrusted-authorization module generates and sends a response message indicating failure and saves the cause of failure.

Step 108, in which the entrusted-authorization module determines the account-validity verification items and performs verification. If the verification is approved, Step 109 is performed; otherwise, Step 107 is performed; the account-validity verification items comprises at least one of verification of card number, verification of term of validity of the card, verification of check digit of the card, verification of password, verification of CVN, and verification of IC card information; and the entrusted-authorization parameters further comprise account information which comprises information selected from a group comprising the following items: card number, term of validity of the card, check digit of the card, password encryption data, verification number of card (CVN), information in IC card which corresponds to items in the account-validity verification items.

Step 109, in which the entrusted-authorization module determines the account-risk verification items according to account risk information and performs verification according to the determined account-risk verification items; if the verification is approved, Step 110 is performed; otherwise, Step 107 is performed. The entrusted-authorization parameters further comprises account risk information which further comprises information selected from a group comprising the following items: account blacklist, merchant blacklist, and upper limit control that corresponds to account-risk verification items. If the financial account information, transaction-initiation institution information, and transaction amount from the transaction request messages belong to the account risk information in the entrusted-authorization parameters, the verification is not approved; otherwise, the verification is approved.

Step 110, in which the entrusted-authorization module verifies the amount according to account amount in the entrusted-authorization parameters; if the verification is approved, Step 111 is performed; otherwise, Step 112 is performed. Taking a single transaction as an example, if the account amount is larger than or equal to the transaction amount, then the verification is approved; otherwise, the verification is not approved. The present invention is not limited to the case of single transaction and those skilled in the art can devise a verification process for an amount that is added up in multiple transactions.

Step 111, in which the entrusted-authorization module completes the transaction in the transaction request, generates and sends a response message indicating success, and saves transaction information.

Step 112, in which the entrusted-authorization module performs transaction delivering; that is, when the switch module switches the transaction to the accounting system, the entrusted-authorization module delivers the transaction information and the cause of failure during entrusted-authorization to the accounting system. Optionally, the transactions are delivered in a manner of batch files or on-line messages.

Step 113, in which the entrusted-authorization parameters are uploaded; that is, when the accounting system is available, the entrusted-authorization parameters defined from the accounting system are uploaded to the entrusted-authorization module.

The main idea of the invention lies in that the entrusted-authorization member institutions designate the various verification items, and a control with maximum freedom is provided for the admitted member institutions. Therefore, the above described embodiments of the invention are merely exemplary rather than limiting the invention. For example, the sequence of steps 104, 106, 108 and 109 can be adjusted. Alternatively, some steps can be omitted; for example, steps 106 and 109 can be omitted. Those skilled in the art can make modifications to the invention.

It can be known from the embodiments shown in FIGS. 1 and 2 that although only one accounting system is shown in the invention, the invention is not limited to having only one accounting system. Those skilled in the art can add several accounting systems according to the actual requirement.

It can be known from the embodiments shown in FIGS. 1 and 2 that these embodiments are implemented through computer systems and networks and although some items in the account-validity verification items and account-risk verification items are described in the invention, the invention is not limited thereto. Those skilled in the art can devise other verification items without departing from the scope of protection of the invention.

In light of the above teaching, those skilled in the art can readily envisage other embodiments, combinations and modifications of the invention. Therefore, when considered with reference to the above description and the accompanying drawings, the invention is defined merely by the technical solutions.

What is claimed is:

1. An entrusted-authorization method for an entrusted-authorization entity in an entrusted-authorization system including the entrusted-authorization entity and an accounting system of a member institution of the entrusted-authorization system, comprising:
   receiving, by a switch entity, a transaction request from a client terminal about a transaction with the accounting system, the switch entity being connected to the accounting system and the entrusted-authorization entity respectively, wherein the switch entity is configured to forward the transaction request to the accounting system for processing;
   determining, by the switch entity, that the accounting system is unavailable to be connected to process the transaction request;
   in response to determining that the accounting system is unavailable, sending, by the switch entity, the transaction request of the client terminal to the entrusted-authorization entity instead of sending to the accounting system, wherein the transaction request includes financial account information, financial institution information, transaction-initiation institution information, and transaction amount;
   verifying, by the entrusted-authorization entity, the transaction request according to entrusted-authorization parameters stored on the entrusted-authorization entity, wherein the entrusted-authorization parameters are defined specifically by the accounting system, and the verifying the transaction request further includes:
      verifying the financial institution information and transaction-initiation institution information based on the entrusted-authorization parameters stored on the entrusted-authorization entity, wherein the entrusted-authorization parameters include financial institution information, transaction-initiation institution information, account amount, and account information;

verifying a transaction type of the transaction in the transaction request based on the entrusted-authorization parameters stored on the entrusted-authorization entity, wherein the entrusted-authorization parameters further include permitted transaction types defined by the accounting system, such that the accounting system entrusts the entrusted-authorization entity to approve the permitted transaction types defined by the accounting system on behalf the accounting system when the accounting system is unavailable, verifying account validity of the transaction request based on the entrusted-authorization parameters stored on the entrusted-authorization entity, wherein the entrusted-authorization parameters further include account-validity verification items defined by the accounting system in a customized manner so as to authorize the entrusted-authorization to perform specific validity verification on behalf of the account system, and verifying the transaction amount in the transaction request based on the account amount in the entrusted-authorization parameters stored on the entrusted-authorization entity;

after the transaction request is successfully verified, completing the transaction of the transaction request, and in response to the accounting system remaining unavailable, generating and saving transaction information corresponding to the transaction completed on the entrusted-authorization entity, wherein the transaction information includes financial account information, financial institution information, transaction-initiation institution information, transaction amount, transaction types, and transaction dates;

after saving the transaction information on the entrusted-authorization entity, determining, by the switch entity, that the accounting system is available to be connected, delivering, by the entrusted-authorization entity, to the switch entity the transaction information about the transaction completed when the accounting system was unavailable to be connected and cause of failure during entrusted-authorization operation on behalf of the accounting system, and forwarding, by the switch entity to the accounting system, the transaction information and the cause of failure when the accounting system was unavailable to be connected, wherein when the accounting system is available to be connected, a transaction request from the client terminal is directly sent by the switch entity to the accounting system without going through the entrusted-authorization entity; and receiving, by the entrusted-authorization entity via the switch entity, new entrusted-authorization parameters defined and sent by the accounting system for future entrusted-authorization operation.

2. The entrusted-authorization method according to claim 1, wherein:

the account information in the entrusted-authorization parameters includes one or more of: a card number for each of a plurality of cards, term of validity of the cards, check digits of the cards, password encryption data for each of the cards, a verification number of the card (CVN) for each of the cards, information in IC for each of the cards; and the account-validity verification items include one or more of: verification of the card numbers, verification of the terms of validity, verification of the check digits, verification of the password encryption data, verification of the CVN, and verification of the IC card information.

3. The entrusted-authorization method according to claim 1, wherein the verifying the transaction request further includes:

verifying account risk based on the entrusted-authorization parameters stored on the entrusted-authorization entity, wherein the entrusted-authorization parameters further include account-risk verification items defined by the accounting system in for specific account-risk verification on behalf of the account system, wherein the account-risk verification items include at least one of verification of account blacklist, verification of merchant blacklist, and verification of upper limit control, and wherein the entrusted-authorization parameters further include information on account blacklist, merchant blacklist, and account upper limit, corresponding to the account-risk verification items.

4. The entrusted-authorization method according to claim 1, wherein the verifying the transaction request further includes:

first verifying validity of a transaction request messaging carrying the transaction request; and when the verifying validity of the transaction request messaging fails, generating a response message indicating failure, and saving a cause of failure in the entrusted-authorization entity.

5. The entrusted-authorization method according to claim 1, further comprising:

determining that the accounting system is available, sending the transaction request to the accounting system instead of the entrusted-authorization entity for processing.

6. The entrusted-authorization method according to claim 1, wherein the verifying the financial institution information and transaction-initiation institution information further includes:

determining whether the financial institution information and transaction-initiation institution information is consistent with the financial institution information and transaction-initiation institution information in the entrusted-authorization parameters; and determining a success of the verifying when it is determined that the financial institution information and transaction-initiation institution information is consistent with the financial institution information and transaction-initiation institution information in the entrusted-authorization parameters.

7. The entrusted-authorization method according to claim 1, wherein the verifying the transaction type of the transaction in the transaction request further includes:

determining whether the transaction type of the transaction request is among the permitted transaction types in the entrusted-authorization parameters; and determining a success of the verifying when it is determined that the transaction type of the transaction request is among the permitted transaction types in the entrusted-authorization parameters.

8. The entrusted-authorization method according to claim 1, wherein the verifying the transaction amount in the transaction request further includes:
   determining whether the account amount in the entrusted-authorization parameters is larger than or equal to the transaction amount in the transaction request; and
   determining a success of the verifying when it is determined that the account amount in the entrusted-authorization parameters is larger than or equal to the transaction amount in the transaction request.

* * * * *